(12) United States Patent
Base et al.

(10) Patent No.: US 10,694,653 B2
(45) Date of Patent: Jun. 30, 2020

(54) ROTARY APPARATUS WITH PROTECTIVE KNIFE

(71) Applicant: Deere & Company, Moline, IL (US)

(72) Inventors: Douglas S. Base, Coffeyville, KS (US); Jeffrey S. Turner, Coffeyville, KS (US)

(73) Assignee: Deere & Company, Moline, IL (US)

( * ) Notice: Subject to any disclaimer, the term of this patent is extended or adjusted under 35 U.S.C. 154(b) by 392 days.

(21) Appl. No.: 15/607,722

(22) Filed: May 30, 2017

(65) Prior Publication Data

US 2018/0347562 A1 Dec. 6, 2018

(51) Int. Cl.
| | |
|---|---|
| *A01B 33/14* | (2006.01) |
| *B60B 27/02* | (2006.01) |
| *B60B 27/00* | (2006.01) |
| *F16C 33/72* | (2006.01) |
| *F16C 33/78* | (2006.01) |

(52) U.S. Cl.
CPC .......... *A01B 33/14* (2013.01); *B60B 27/0047* (2013.01); *B60B 27/0073* (2013.01); *B60B 27/02* (2013.01); *F16C 33/72* (2013.01); *B60B 2900/321* (2013.01); *F16C 33/7886* (2013.01); *F16C 2326/20* (2013.01)

(58) Field of Classification Search
CPC ..... A01B 33/14; A01B 33/142; A01B 33/146; B60B 27/0047; B60B 27/0073; B60B 27/02; B60B 2900/321; B60B 2900/323; F16C 33/72; F16C 33/723; F16C 33/743; F16C 33/7886; F16C 33/7889; F16C 2326/20

USPC .......................................................... 277/348
See application file for complete search history.

(56) References Cited

U.S. PATENT DOCUMENTS

| | | | | |
|---|---|---|---|---|
| 4,295,532 A | * | 10/1981 | Williams ............... | A01C 5/064 111/139 |
| 4,875,334 A | | 10/1989 | Rajsigl et al. | |
| 5,412,930 A | * | 5/1995 | Sheldon, Jr. ........... | A01D 46/14 56/41 |
| 8,141,805 B1 | | 3/2012 | Isaac et al. | |

(Continued)

FOREIGN PATENT DOCUMENTS

| | | |
|---|---|---|
| DE | 1125600 B | 3/1962 |
| DE | 2224764 A1 | 11/1973 |

(Continued)

OTHER PUBLICATIONS

German Search Report issued in counterpart application number 102018205918.7 dated Jan. 3, 2019. (10 pages).

(Continued)

*Primary Examiner* — Nathan Cumar (57) ABSTRACT

A rotary apparatus comprises a housing, a rotor, and a face seal. The rotor is mounted for rotation relative to the housing. The housing and the rotor cooperate to provide an annular clearance passage therebetween. The face seal is positioned in communication with the clearance passage and establishes a sealed connection between the housing and the rotor to block ingress of debris from the clearance passage. The housing or the rotor comprises a knife partially defining the clearance passage to cut debris that may enter the clearance passage. The rotary apparatus may be used, for example, in a shaft assembly or a final drive.

10 Claims, 10 Drawing Sheets

(56) References Cited

U.S. PATENT DOCUMENTS

| | | | | |
|---|---|---|---|---|
| 8,231,184 B2* | 7/2012 | Mulligan | ............... | B62D 55/15 |
| | | | | 305/136 |
| 2001/0028845 A1 | 10/2001 | Langston et al. | | |
| 2010/0078896 A1* | 4/2010 | Johannsen | ......... | C10M 169/044 |
| | | | | 277/358 |
| 2010/0230172 A1* | 9/2010 | Peterson | ................ | F16J 15/344 |
| | | | | 175/371 |
| 2014/0151966 A1* | 6/2014 | Johannsen | ............... | F16J 15/02 |
| | | | | 277/320 |

FOREIGN PATENT DOCUMENTS

| | | | |
|---|---|---|---|
| DE | 2449142 A1 | 4/1975 | |
| EP | 1417429 B1 | 11/2006 | |
| WO | 2018095867 A1 | 5/2018 | |

OTHER PUBLICATIONS

Background Information (1 page) (admitted as prior art prior to May 30, 2017).

* cited by examiner

ROTARY APPARATUS WITH PROTECTIVE KNIFE

FIELD OF THE DISCLOSURE

The present disclosure relates to a rotary apparatus, and, in particular, to a rotary apparatus having a face seal.

BACKGROUND OF THE DISCLOSURE

A work vehicle (e.g., a four-wheel drive loader, a crawler) at a work site may encounter stringy debris that can wrap around an axle of the work vehicle and compromise a face seal of the axle. For example, it is known for baling twine in a feed lot and magnetic tape in a landfill to wrap around the axle and tighten so as to make its way through a labyrinth to the face seal causing the face seal to leak.

SUMMARY OF THE DISCLOSURE

According to an aspect of the present disclosure, a rotary apparatus comprises a housing, a rotor, and a face seal. The rotor is mounted for rotation relative to the housing. The housing and the rotor cooperate to provide an annular clearance passage therebetween. The face seal is positioned in communication with the clearance passage and establishes a sealed connection between the housing and the rotor to block ingress of debris from the clearance passage. The housing or the rotor comprises a knife partially defining the clearance passage to cut debris that may enter the clearance passage. The rotary apparatus may be used, for example, in a shaft assembly or a final drive.

The above and other features will become apparent from the following description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
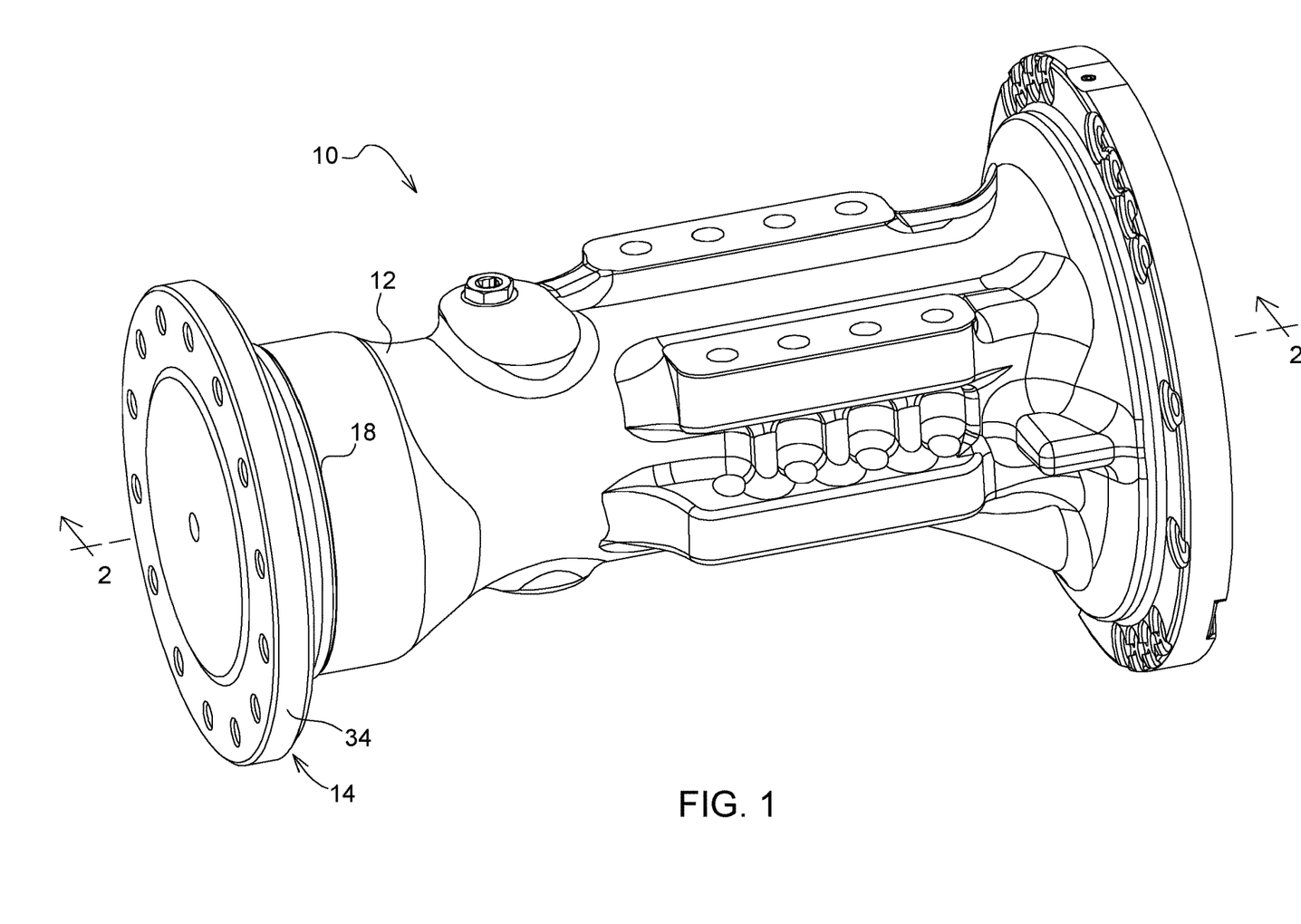
FIG. 1 is a perspective view showing a rotary apparatus configured, for example, as an axle with a housing and a rotor.

Referring to FIG. 1, a rotary apparatus 10 comprises a housing 12 and a rotor 14 mounted for rotation relative to the housing 12. The rotary apparatus 10 is shown, for example, as an axle assembly of a four-wheel drive loader, with the housing 12 and the rotor 14 configured respectively as the axle housing and the axle of the axle assembly. The rotary apparatus 10 may take a wide variety of configurations, a final drive being another example. The rotary apparatus 10 may be used in a wide variety of applications, such as, for example, in work vehicles (four-wheel drive loaders and crawlers being but two examples) or other vehicles, with the axle assembly being, for example, fixed or oscillatable relative to the vehicle frame.

Figure 2:
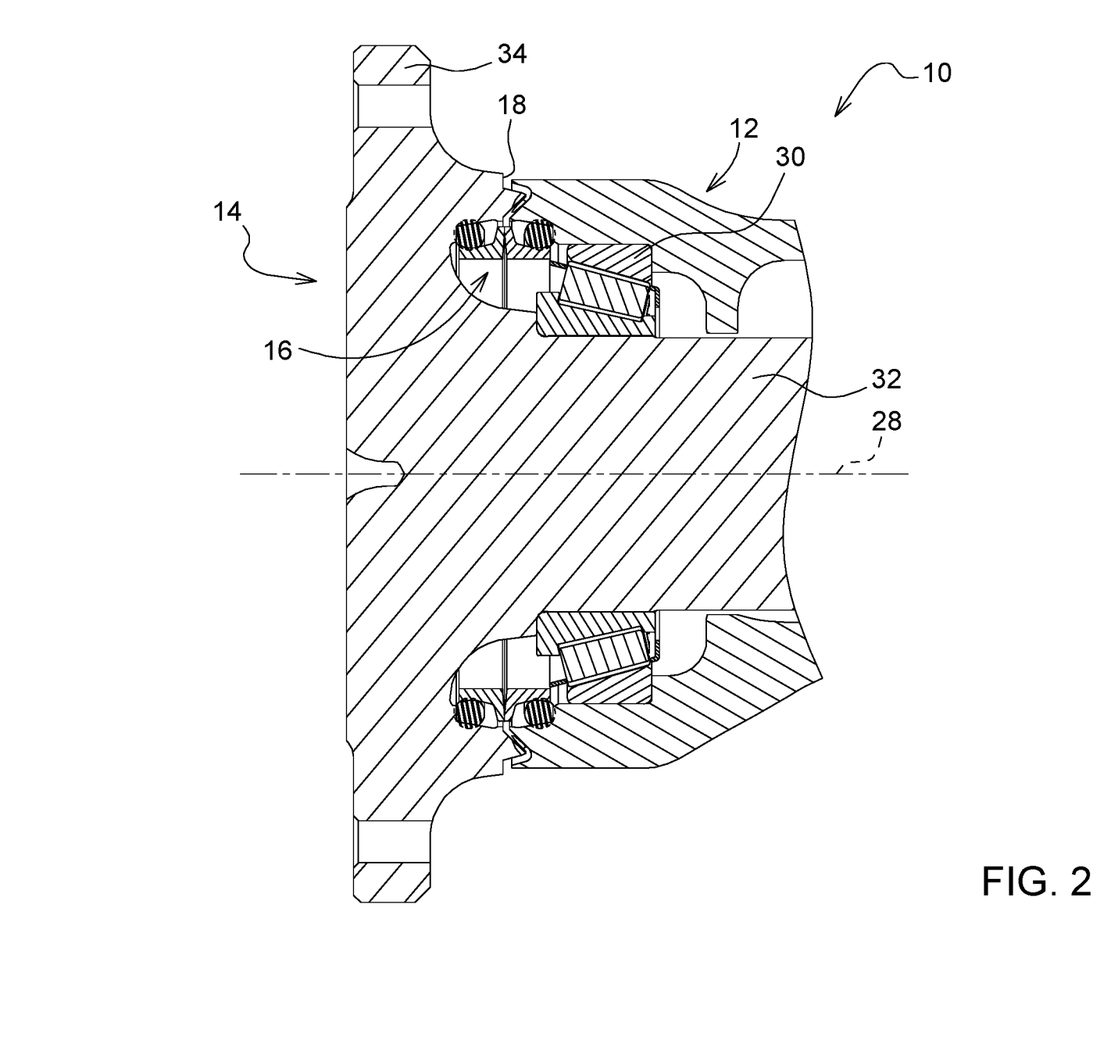
FIG. 2 is a sectional view taken along lines 2-2 of FIG. 1.
Figure 3:
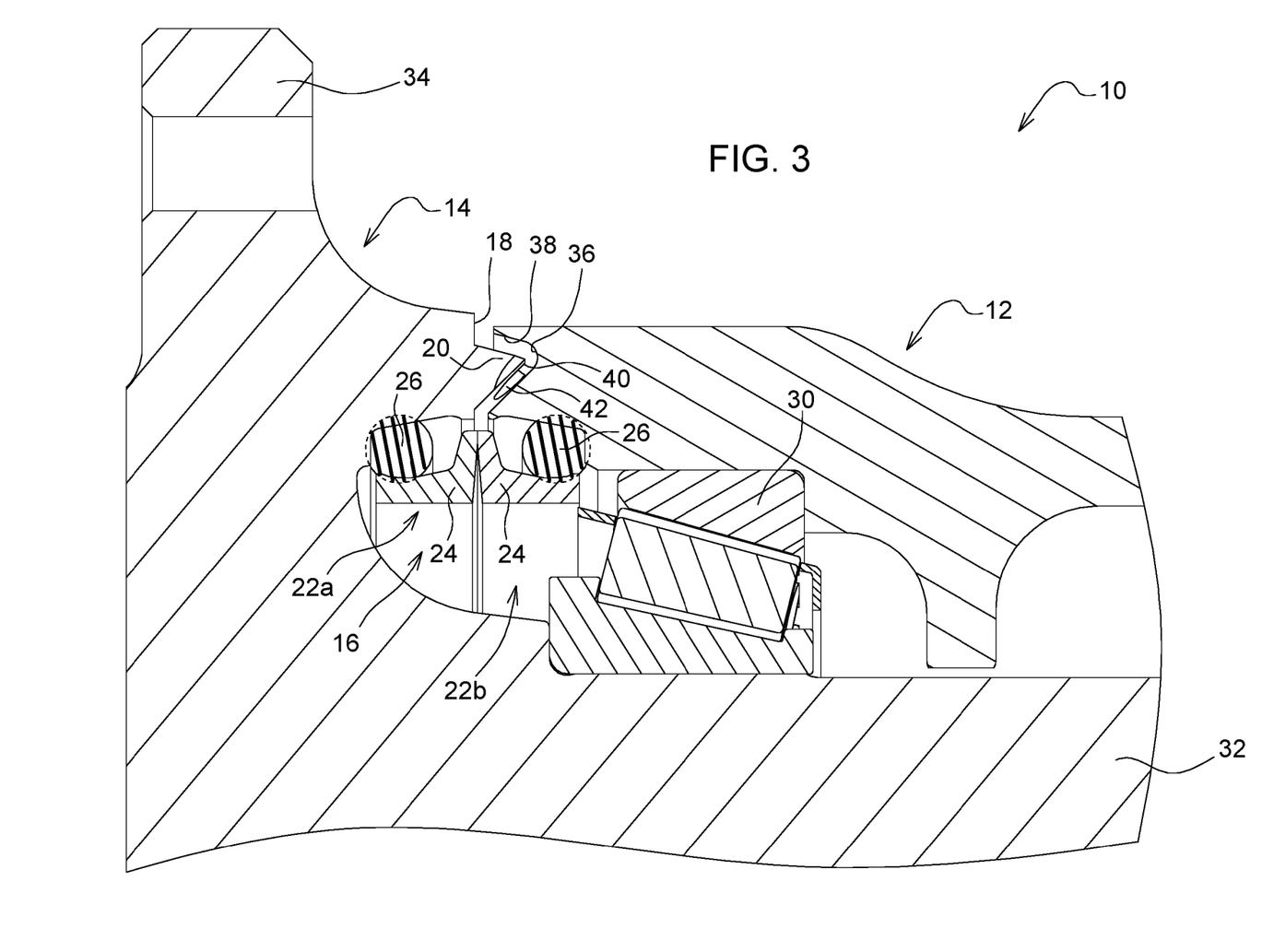
FIG. 3 is a sectional view showing an enlarged region of FIG. 2 with a clearance passage between the housing and the rotor and a face seal positioned in communication with the clearance passage, the rotor comprising a knife to cut debris that may enter the clearance passage.

Referring to FIGS. 2 and 3, the rotary apparatus 10 comprises a face seal 16. The housing 12 and the rotor 14 cooperate to provide an annular clearance passage 18 between the housing 12 and the rotor 14. The face seal 16 is positioned in communication with the clearance passage 18 and establishes a sealed connection between the housing 12 and the rotor 14 to block ingress of debris from the clearance passage 18. The rotor 14 comprises a knife 20 partially defining the clearance passage 18 to cut debris that may enter the clearance passage 18 so that the cut debris may more readily exit the clearance passage 18 out of the rotary apparatus 10 (e.g., by centrifugal force or gravity), thereby protecting the face seal 16.

The face seal 16 is configured, for example, as an axial face seal comprising a first annular member 22a and a second annular member 22b. Each of the first and second annular members 22a, 22b comprises a sealing ring 24, made, for example, of a metal, and a compressible biasing ring 26, made, for example, of an elastomeric material (e.g., fluoroelastomer, hydrogenated nitrile butadiene rubber (HNBR)). Each of the biasing rings 26 is received and compressed in a pocket defined between the respective sealing ring 24 and a portion of the respective housing 12 or rotor 14 (the biasing rings 26 are shown in their relaxed state, although it is to be understood that they will be compressed when the rotor apparatus 10 is assembled). The cross-section of the relaxed state of the biasing rings 26 may be configured in a wide variety of ways. For example, the cross-section may be circular as shown (e.g., on board a four-wheel drive loader or other application) or generally rectangular (e.g., on board a crawler or other application), to name but two examples. The biasing rings 26 press respectively the sealing rings 24 against one another to establish the sealed connection. As the rotor 14 rotates about an axis 28 of the rotor 14, the sealing ring 24 of the first annular member 22a slides against the sealing ring 24 of the second annular member 22b.

The rotary apparatus 10 comprises a bearing 30 in the vicinity of the face seal 16. The face seal 16 is configured to block ingress of debris to the bearing 30 to protect the bearing 30.

The rotor 14 comprises a shaft 32 and a flange 34. The shaft 32 is mounted for rotation in the housing 12 about the axis 28 via the bearing 30 and one or more other bearings (e.g., one other bearing near the other end of the shaft 32). The flange 34 extends radially from the shaft 32, and the knife 20 is mounted to the flange 34. The knife 20 projects axially inwardly away from the flange 34 toward the housing 12. The face seal 16 is positioned radially between the knife 20 and the shaft 32.

The housing 12 comprises an annular recess 36. The knife 20 is annular and projects into the annular recess 36 such that the knife 20 and the recess 36 are axially opposed to one another relative to the axis 28 (FIG. 3). The knife 20 and the recess 36 are correspondingly generally V-shaped in cross-section. The clearance passage 18 comprises a labyrinth 38. The labyrinth 38 is provided at least in part by projection of the knife 20 into the recess 36.

Figure 4:
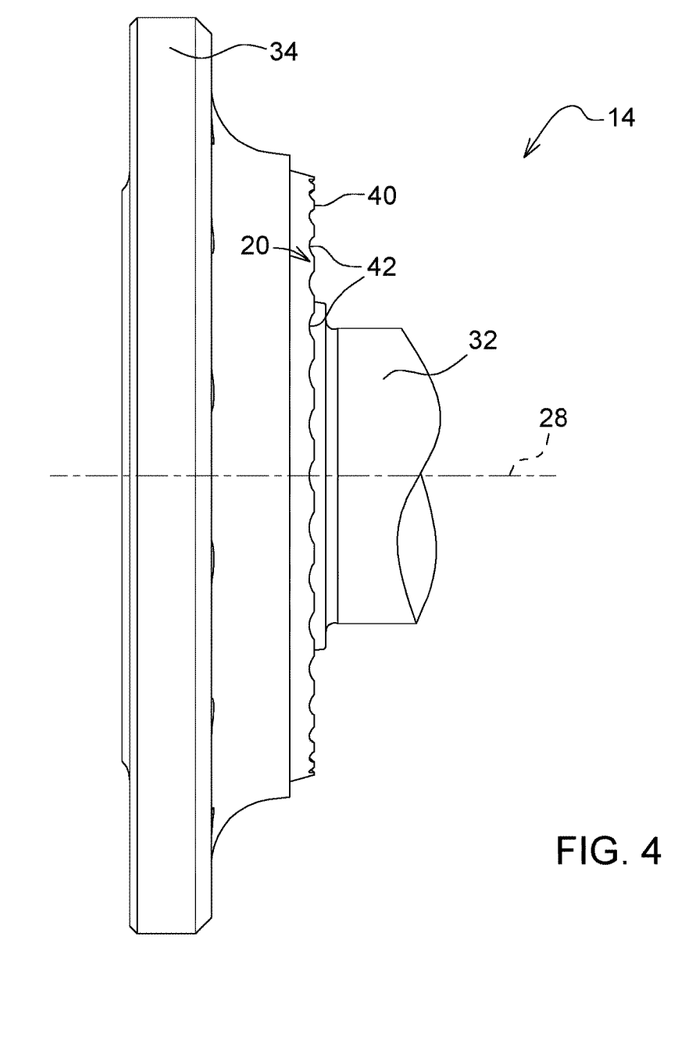
FIG. 4 is an elevational view showing the knife.
Figure 5:
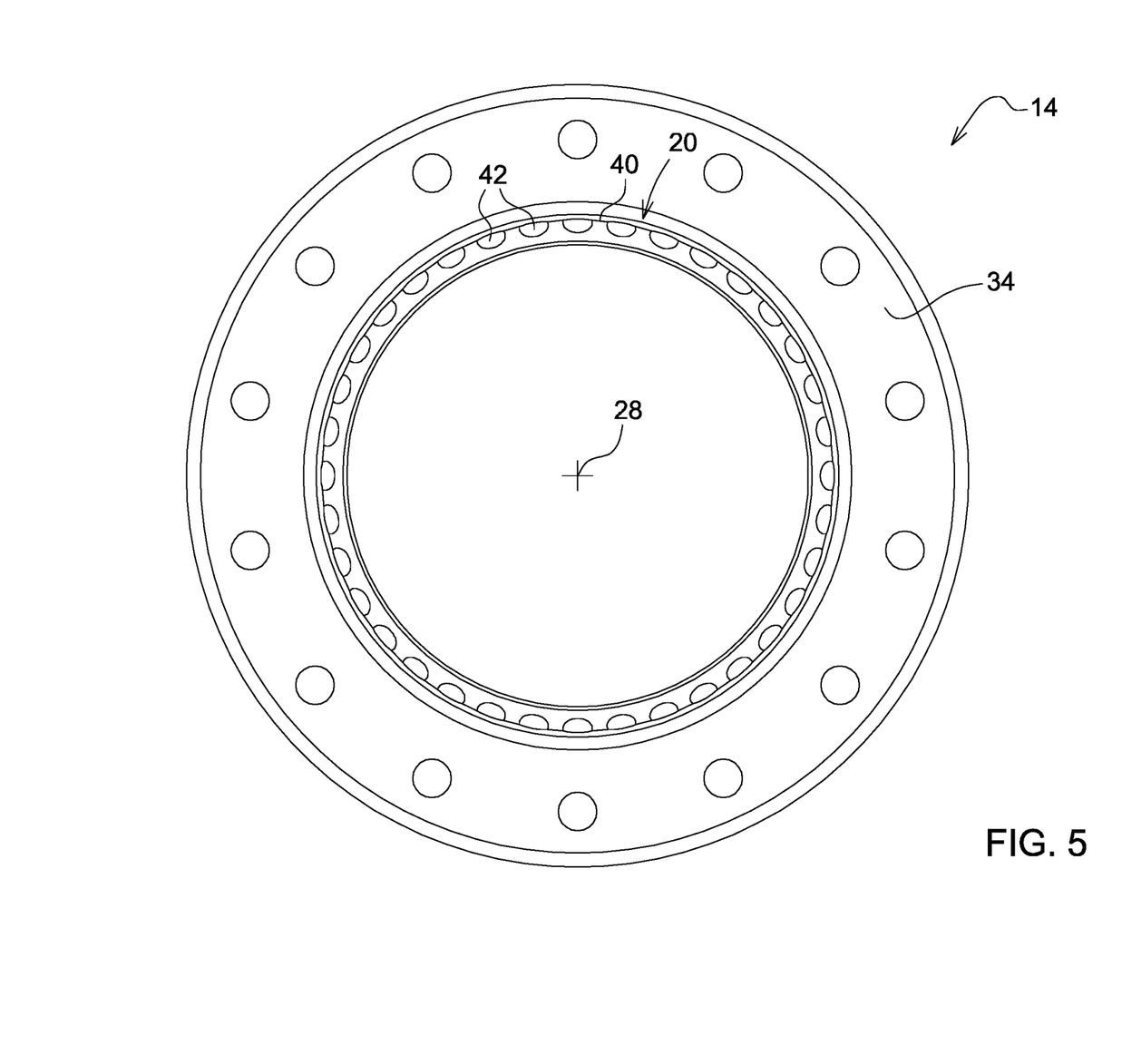
FIG. 5 is an elevational view along an axis of rotation of the rotor showing the knife (for clarity of illustration the radially inner portion of the rotor is not shown)

Referring to FIGS. 4 and 5, the knife 20 comprises a serrated cutting edge 40. The knife 20 may be scalloped to provide the annular knife 20 with the serrated cutting edge 40. For example, the knife 20 comprises a plurality of scallops 42 positioned radially inward of the serrated cutting edge 42. In another embodiment, the knife 20 comprises the serrated cutting edge 42 without scallops.

Figures 6, 11:
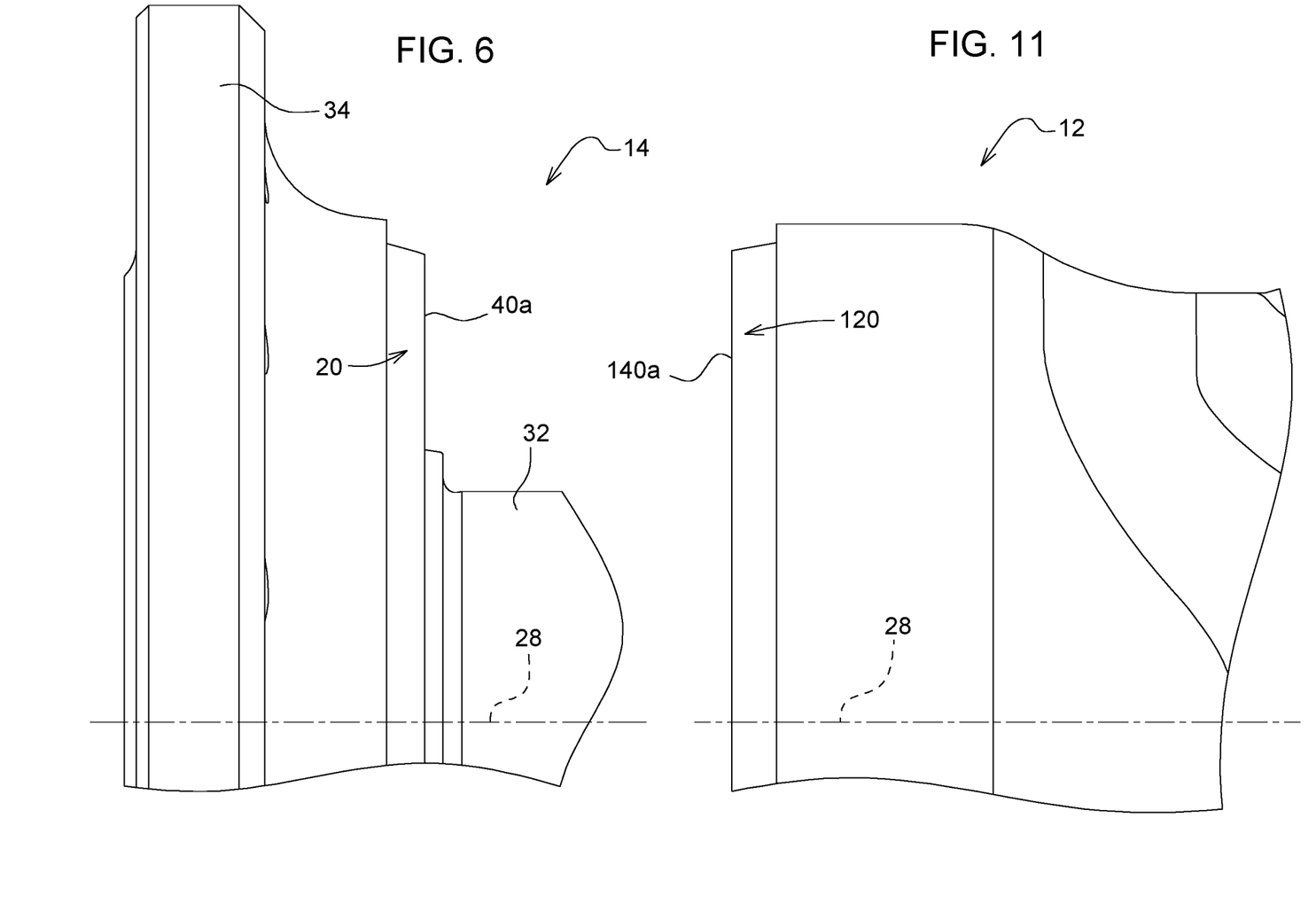
FIG. 6 is an elevational view, with portions broken away, showing an alternative configuration of the knife with a plain cutting edge.
FIG. 11 is an elevational view, with portions broken away, showing an alternative configuration of the knife of the second embodiment with a plain cutting edge.

Referring to FIG. 6, in yet another embodiment, the knife 20 may comprise an annular plain cutting edge 40*a* (without scallops) in place of the serrated cutting edge 40.

Figure 7:
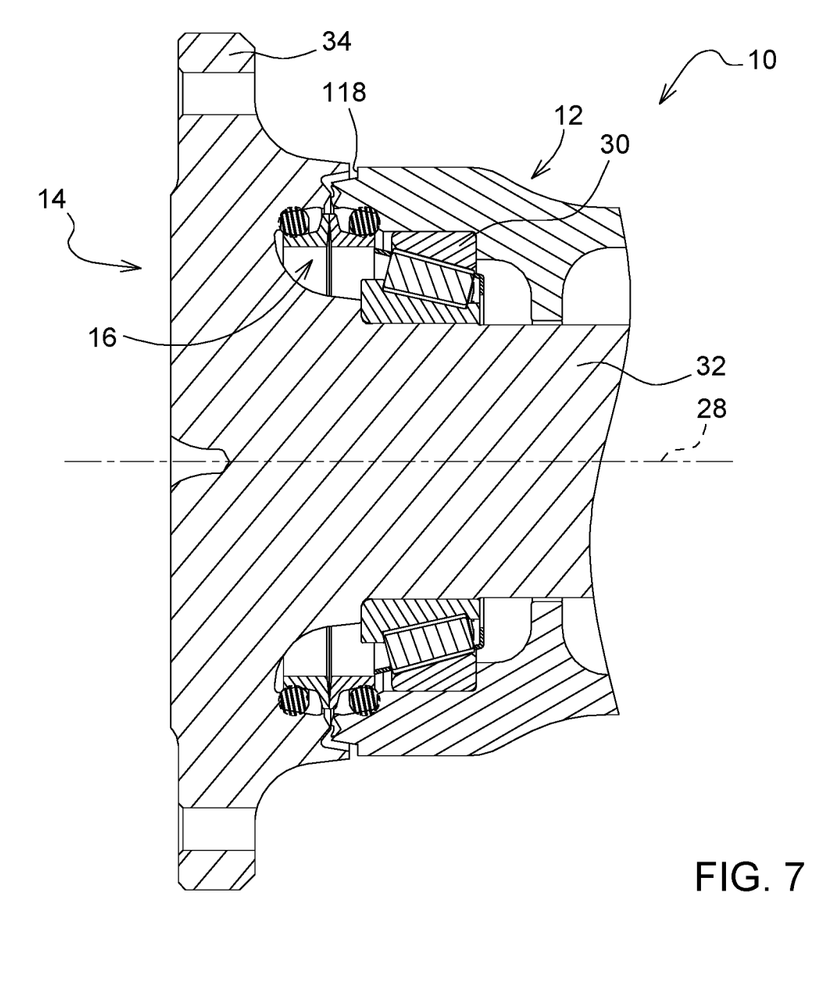
FIG. 7 is a sectional view similar to FIG. 2 showing a second embodiment with the housing comprising a knife.
Figure 8:
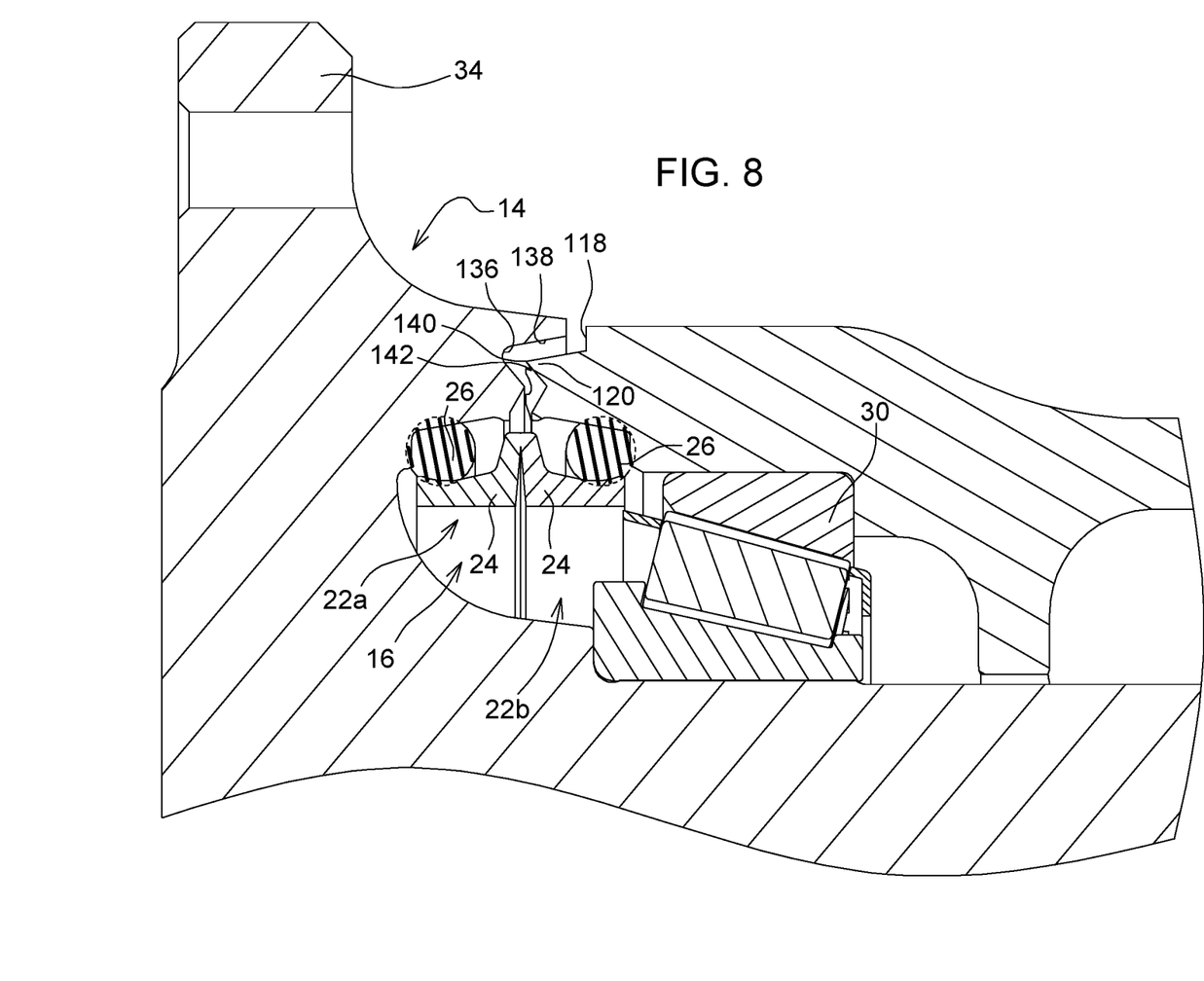
FIG. 8 is a sectional view showing an enlarged region of FIG. 7.

Referring to FIGS. 7 and 8, a rotary apparatus 110 is similar to the rotary apparatus 10, except that the housing 12 comprises the knife rather than the rotor 14. As such, some of the reference numbers used in connection with rotary apparatus 10 is used in connection with rotary apparatus 110.

The housing 12 comprises a knife 120 partially defining a clearance passage 118 to cut debris that may enter the clearance passage 118 so that the cut debris may more readily exit the clearance passage 118 out of the rotary apparatus 110 (e.g., by centrifugal force or gravity). The housing 12 comprises an axially outer portion to which the knife 120 is mounted. The knife 120 projects axially outwardly away from the axially outer portion of the housing 12 toward the housing 12. The face seal 16 is positioned radially between the knife 120 and the shaft 32.

The flange 34 comprises an annular recess 136. The knife 120 is annular and projects into the annular recess 136 such that the knife 120 and the recess 136 are axially opposed to one another relative to the axis 28 (FIG. 8). The knife 120 and the recess 136 are correspondingly generally V-shaped in cross-section. The clearance passage 118 comprises a labyrinth 138. The labyrinth 138 is provided at least in part by projection of the knife 120 into the recess 136.

Figure 9:
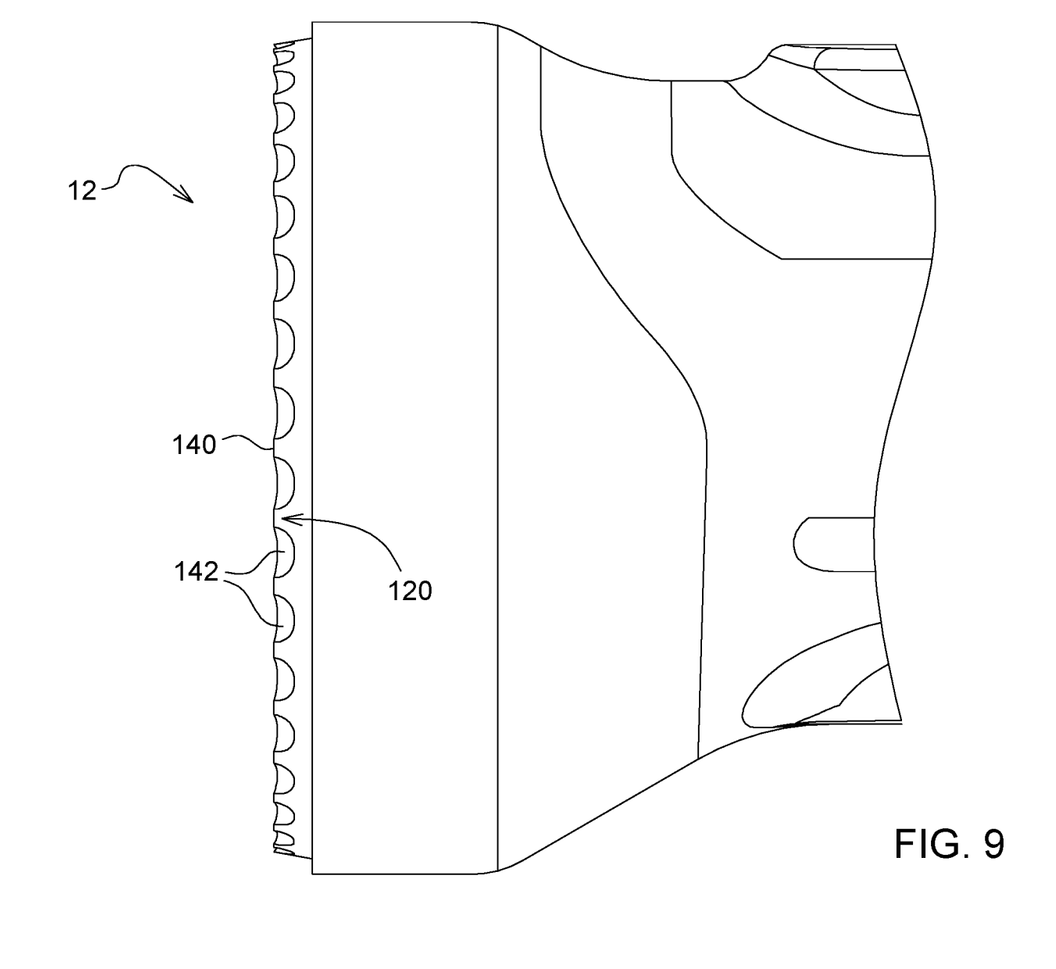
FIG. 9 is an elevational view showing the knife of the second embodiment.
Figure 10:
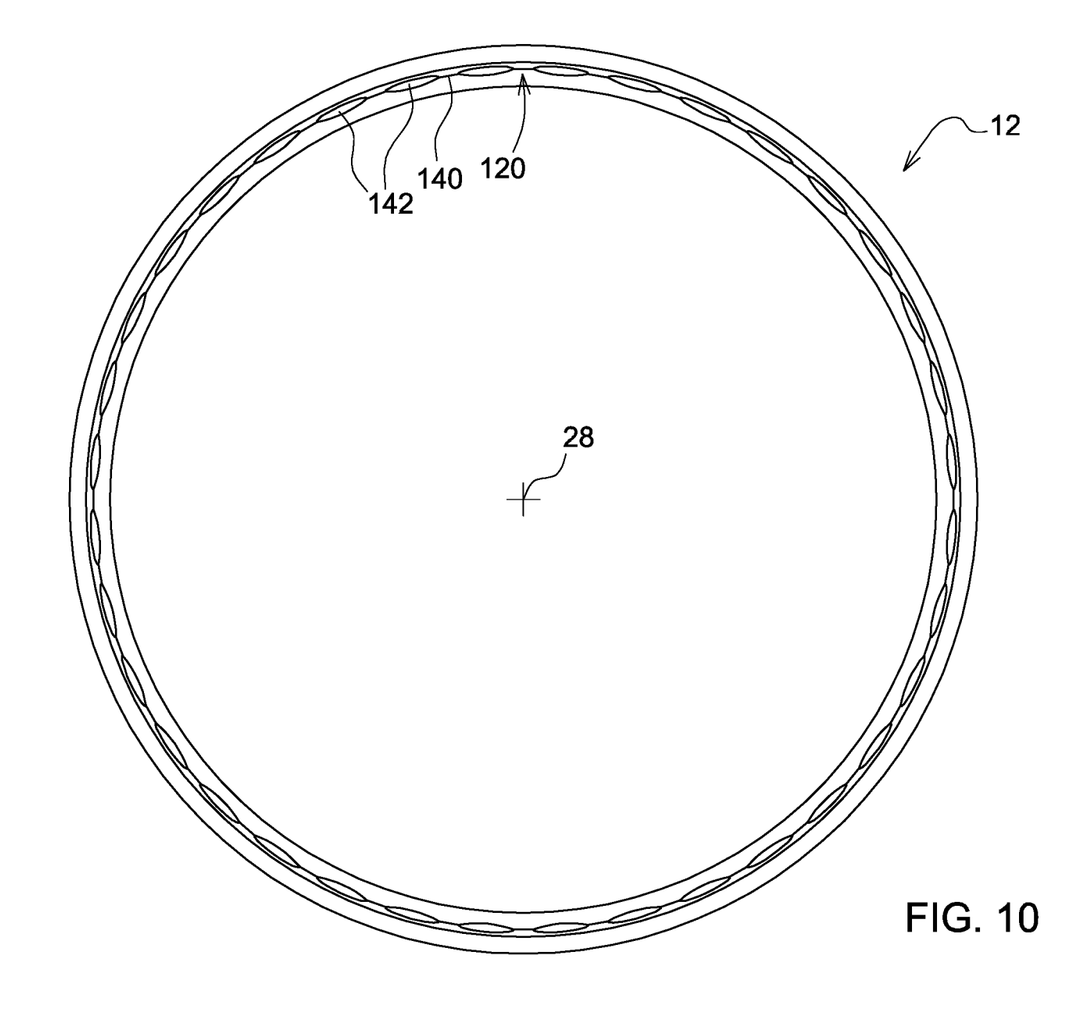
FIG. 10 is an elevational view along an axis of rotation of the housing showing the knife of the second embodiment (for clarity of illustration the radially inner portion of the housing is not shown)

Referring to FIGS. 9 and 10, the knife 120 comprises a serrated cutting edge 140. The knife may be scalloped to provide the knife 120 with the serrated cutting edge 140. For example, the knife 120 comprises a plurality of scallops 142 positioned radially inward of the serrated cutting edge 142. In another embodiment, the knife 120 comprises the serrated cutting edge without scallops.

Referring to FIG. 11, in yet another embodiment, the knife 120 may comprise an annular plain cutting edge 140*a* (without scallops) in place of the serrated cutting edge 140.

The knife 20, 120 is configured to cut debris that may enter the clearance passage 18, 118 and could encroach upon the face seal 16. As alluded to above, the rotary apparatus 10, 110 may be an axle assembly on a work vehicle (or other vehicle). The work vehicle may encounter baling twine, magnetic tape, or other debris at the worksite, which may tend to wrap around the rotary apparatus 10, 110 and enter the clearance passage 18, 118. In the event that such debris begins to do so, the knife 20, 120 is configured to cut the debris before it becomes tight around and compromises the face seal 16. As the rotor 14 rotates about its axis 28, centrifugal force tends to cause the cut debris to exit the clearance passage 18, 118, and gravity will have a similar effect on the lower side of the rotary apparatus 10, 110.

While the present disclosure has been illustrated and described in detail in the drawings and foregoing description, such illustration and description is to be considered as not restrictive in character. It is to be understood that all changes and modifications that come within the spirit of the present disclosure are desired to be protected. It will be noted that alternative embodiments of the present disclosure may not include all of the features shown and described. Those of ordinary skill in the art may readily devise their own implementations that incorporate one or more of the features of the present disclosure and fall within the spirit and scope of the appended claims.

What is claimed is:

1. A rotary apparatus, comprising
   a housing,
   a rotor mounted for rotation relative to the housing, the housing and the rotor cooperating to provide an annular clearance passage therebetween, and
   a face seal positioned in communication with the clearance passage and establishing a sealed connection between the housing and the rotor to block ingress of debris from the clearance passage, the housing or the rotor comprising a knife partially defining the clearance passage to cut debris that may enter the clearance passage;
   wherein the knife comprises a serrated cutting edge; and
   wherein the knife comprises a plurality of scallops positioned radially inward of the serrated cutting edge.

2. The rotary apparatus of claim 1, wherein the other of the housing or the rotor comprises an annular recess, and the knife projects into the annular recess.

3. The rotary apparatus of claim 2, wherein the knife and the annular recess are correspondingly generally V-shaped in cross-section.

4. The rotary apparatus of claim 2, wherein the clearance passage comprises a labyrinth provided at least in part by projection of the knife into the annular recess.

5. The rotary apparatus of claim 2, wherein the knife and the annular recess are axially opposed to one another relative to an axis of rotation of the rotor.

6. The rotary apparatus of claim 1, wherein the knife is annular.

7. The rotary apparatus of claim 1, wherein the rotor comprises a shaft rotatably positioned in the housing, and the face seal is positioned radially between the knife and the shaft.

8. The rotary apparatus of claim 1, wherein the housing comprises the knife.

9. The rotary apparatus of claim 1, wherein the rotor comprises the knife.

10. The rotary apparatus of claim 9, wherein the rotor comprises a shaft rotatably positioned in the housing and a flange extending radially from the shaft, and the knife is mounted to the flange.

* * * * *